US007904079B1

(12) United States Patent
Lundy et al.

(10) Patent No.: US 7,904,079 B1
(45) Date of Patent: Mar. 8, 2011

(54) METHOD, APPARATUS, AND SYSTEM FOR MONITORING USER-INTERFACE OPERATION TO FACILITATE ANALYSIS AND REPORT GENERATION

(75) Inventors: Michael T. Lundy, Olathe, KS (US); Benjamin P. Blinn, Leawood, KS (US); Louie E. Wingo, Liberty, MO (US); Yat-Sang Hung, San Diego, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1111 days.

(21) Appl. No.: 11/058,863

(22) Filed: Feb. 16, 2005

(51) Int. Cl.
*H04W 24/00* (2009.01)
*H04W 4/00* (2009.01)

(52) U.S. Cl. .......... 455/423; 455/432.3; 455/435.1; 455/414.1; 455/425

(58) Field of Classification Search .......... 455/405, 455/407, 2.01, 419, 418, 67.11–67.7, 408, 455/423, 412.1, 115.1–115.4, 226.1, 456.1–457; 379/111–114.1, 101–35; 725/9–22; 340/635
See application file for complete search history.

(56) References Cited

U.S. PATENT DOCUMENTS

| | | | |
|---|---|---|---|
| 5,778,368 A | 7/1998 | Hogan et al. | |
| 5,946,665 A * | 8/1999 | Suzuki et al. | 705/26 |
| 5,987,306 A | 11/1999 | Nilsen et al. | |
| 6,094,213 A | 7/2000 | Mun et al. | |
| 6,429,855 B2 | 8/2002 | Pabon et al. | |
| 6,529,724 B1 * | 3/2003 | Khazaka et al. | 455/405 |
| 6,615,253 B1 | 9/2003 | Bowman-Amuah | |
| 6,725,228 B1 * | 4/2004 | Clark et al. | 707/102 |
| 6,754,470 B2 * | 6/2004 | Hendrickson et al. | 455/67.11 |
| 6,959,182 B2 * | 10/2005 | Lingafeldt et al. | 455/405 |
| 7,080,141 B1 * | 7/2006 | Baekelmans et al. | 709/224 |
| 7,126,626 B2 | 10/2006 | Sawahara et al. | |
| 7,206,548 B1 | 4/2007 | Sumler et al. | |
| 7,283,816 B2 | 10/2007 | Fok et al. | |
| 7,379,977 B2 * | 5/2008 | Walrath | 709/219 |
| 7,412,264 B2 * | 8/2008 | Swallow | 455/567 |
| 2002/0069037 A1 | 6/2002 | Hendrickson et al. | |
| 2002/0127993 A1 | 9/2002 | Zappala | |
| 2003/0058275 A1 | 3/2003 | Pilu et al. | |
| 2004/0002326 A1 | 1/2004 | Maher | |
| 2004/0058652 A1 | 3/2004 | McGregor et al. | |
| 2004/0098456 A1 | 5/2004 | Krzyzanowski et al. | |
| 2004/0199303 A1 | 10/2004 | Ohmura et al. | |
| 2005/0062850 A1 | 3/2005 | Lin | |
| 2005/0114504 A1 | 5/2005 | Marolia et al. | |
| 2005/0212927 A1 | 9/2005 | Hamamura et al. | |

(Continued)

OTHER PUBLICATIONS

Ortiz, "Introduction to OTA Application Provisioning," http://developers.sun.com/mobility/midp/articles/ota/, printed from the World Wide Web, Nov. 2002.

(Continued)

*Primary Examiner* — Charles N Appiah
*Assistant Examiner* — Emem Stephen

(57) ABSTRACT

A method, system, and apparatus for monitoring user-interface operation. One or more wireless communication devices, such as cell phones, will automatically log user-interface events (such as key-presses) and user-interface states (such as display screen state) and will transmit the log-data, via a wireless link, to a central server. The server will then compile the log-data and generate useful output reports regarding user-interface operation. Such reports can assist device manufacturers and distributors (e.g., wireless carriers), triggering changes in user-interface design so as to improve user experience.

13 Claims, 6 Drawing Sheets

U.S. PATENT DOCUMENTS

| | | |
|---|---|---|
| 2005/0213511 A1 | 9/2005 | Reece, Jr. et al. |
| 2006/0033809 A1 | 2/2006 | Farley |
| 2006/0217116 A1 | 9/2006 | Cassett et al. |
| 2007/0053513 A1* | 3/2007 | Hoffberg ............... 380/201 |

OTHER PUBLICATIONS

Spirent Communications, "Universal Tool Suite (UTS) New! UTS," 2001.

testQuest, "Interface for UTS Phones," 2004.

Symantec, Inc., "pcAnywhere™," http://www.symantec.com/pcanywhere/Consumer, printed from the World Wide Web on Oct. 1, 2004.

IBM, "Experience Remote Usability Testing, Part 1," http://www-106.ibm.com/developerworks/web/library/wa-rmusts1/, printed from the World Wide Web on Jul. 29, 2004.

U.S. Appl. No. 11/695,713, filed Apr. 3, 2007.

Office Action from U.S. Appl. No. 11/695,713, dated Nov. 13, 2009.

Office Action from U.S. Appl. No. 11/695,713, dated May 26, 2010.

Office Action from U.S. Appl. No. 10/977,142, dated Oct. 29, 2004.

* cited by examiner

| Screen Name | Action | Time |
|---|---|---|
| Idle | | 1/30/2005 13:30:01 |
| | MENU press | 1/30/2005 15:29:40 |
| | MENU release | 1/30/2005 15:29:41 |
| Menu | | 1/30/2005 15:29:43 |
| | DOWN press | 1/30/2005 15:29:50 |
| | DOWN release | 1/30/2005 15:29:51 |
| | DOWN press | 1/30/2005 15:29:52 |
| | DOWN release | 1/30/2005 15:29:53 |
| | DOWN press | 1/30/2005 15:29:54 |
| | DOWN release | 1/30/2005 15:29:55 |
| | SELECT press | 1/30/2005 15:30:03 |
| | SELECT release | 1/30/2005 15:30:06 |
| Contacts | | 1/30/2005 15:30:10 |
| | L-SOFT press | 1/30/2005 15:30:20 |
| | L-SOFT release | 1/30/2005 15:30:21 |
| Enter Number | | 1/30/2005 15:30:22 |
| | 9 press | 1/30/2005 15:30:23 |
| | 9 release | 1/30/2005 15:30:24 |
| | 1 press | 1/30/2005 15:30:25 |
| | 1 release | 1/30/2005 15:30:26 |
| | 3 press | 1/30/2005 15:30:27 |
| | 3 release | 1/30/2005 15:30:28 |
| | 8 press | 1/30/2005 15:30:29 |
| | 8 release | 1/30/2005 15:30:30 |
| | 9 press | 1/30/2005 15:30:31 |
| | 9 release | 1/30/2005 15:30:32 |
| | 0 press | 1/30/2005 15:30:33 |
| | 0 release | 1/30/2005 15:30:34 |
| | 1 press | 1/30/2005 15:30:35 |
| | 1 release | 1/30/2005 15:30:36 |
| | 2 press | 1/30/2005 15:30:37 |
| | 2 release | 1/30/2005 15:30:38 |
| | 3 press | 1/30/2005 15:30:39 |
| | 3 release | 1/30/2005 15:30:40 |
| | 4 press | 1/30/2005 15:30:41 |
| | 4 release | 1/30/2005 15:30:42 |
| | L-SOFT press | 1/30/2005 15:31:01 |
| | L-SOFT release | 1/30/2005 15:31:02 |

FIG. 4

| Screen Name | Action | Time | Op-Time | Screen Time |
|---|---|---|---|---|
| Idle | | 1/30/2005 13:30:01 | 0:02:00 | 2:01:40 |
| | MENU | 1/30/2005 15:29:41 | 1:59:40 | |
| Menu | | 1/30/2005 15:29:43 | 0:00:02 | 0:00:25 |
| | 3 DOWN | 1/30/2005 15:29:55 | 0:00:12 | |
| | SELECT | 1/30/2005 15:30:06 | 0:00:11 | |
| Contacts | | 1/30/2005 15:30:10 | 0:00:04 | 0:00:11 |
| | ADD (softkey) | 1/30/2005 15:30:21 | 0:00:11 | |
| Enter Number | | 1/30/2005 15:30:22 | 0:00:01 | 0:00:39 |
| | 10 Characters | 1/30/2005 15:30:42 | 0:00:20 | |
| | NEXT (softkey) | 1/30/2005 15:31:01 | 0:00:19 | |

FIG. 6

METHOD, APPARATUS, AND SYSTEM FOR MONITORING USER-INTERFACE OPERATION TO FACILITATE ANALYSIS AND REPORT GENERATION

FIELD OF THE INVENTION

The present invention relates to wireless telecommunications and, more particularly, to interaction with user-interfaces on wireless communication devices.

BACKGROUND

The user-interface has become a significant and increasingly complex element of many wireless communication devices, such as cell phones, personal digital assistants, and the like. As its name implies, the "user-interface" provides a mechanism through which a user can interact with the device. As such, a user-interface typically includes aural, visual, and/or tactile components through which the device can receive input from a user and provide output to the user, as well as a set of underlying control logic that governs operation of the various input/output components.

In general, the user-interface of a wireless communication device will have various states, and the user-interface will transition from one state to another in response to the occurrence of various user-interface events, such as the user pressing certain buttons or speaking certain commands.

By way of example, the user-interface may have a default state in which a display screen presents graphical indications of time of day and signal strength. When a user presses a MENU button on a keypad, the user-interface may then transition to a main-menu state, in which the display screen presents a menu of actions, such as links that the user can select to invoke a phone book application, a messaging application, a web browser application, and the like. In turn, when a user selects a desired menu item, the user-interface may transition to a next state that defines an application-specific screen image or the like.

As another example, the user-interface may have a one state in which the user interface emits audible signals (e.g., ring tones or other alerts) in response to certain stimuli. When a user selects one or more designated menu items or engages one or more other user-interface components (e.g., mechanical switches, etc.), the user-interface may then transition to another state in which the user-interface emits inaudible (or less audible) signals (e.g., vibrations) in response to those stimuli. Other examples of user-interface states and state-transitions are known as well.

Given that the user-interface defines the functional layer through which paying consumers interact with wireless communication devices, the manufacturers and distributors of such devices have an interest in making sure that the user-interface works as desired. To verify this in practice, manufacturers or distributors typically conduct study groups, in which a group of users sit in a room and interact with their devices while study-administrators observe what the users are doing and how the devices are responding. Unfortunately, however, such studies can be expensive. Further, the studies are inherently limited in that they merely reflect user interaction in a simulated test environment rather than in a real-life use scenario, and so the studies do not represent how users would normally interact with their devices.

SUMMARY

The present invention provides an improved method and system for monitoring operation of user-interfaces on wireless communication devices. In a preferred embodiment of the invention, one or more wireless communication devices will automatically log user-interface events and user-interface states during normal device operation and will transmit the log-data via a wireless link to a central monitoring server. There, the log-data will be collected and analyzed, so as to produce output data such as reports or charts that reflect how users tend to interact with their user-interfaces in practice. By way of example, the output data could indicate how long it tends to take for users to navigate through certain menu structures so as to accomplish certain tasks, or what time of day users tend to interact with their devices or with particular user-interface functions. Advantageously, a device manufacturer or wireless carrier can use such output data as a basis to trigger changes in user-interface design and to thereby improve user experience.

This as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 4 is an example table of user-interface log-data recorded by the device of FIG. 3.

FIG. 6 is an example table of translated user-interface data in accordance with the exemplary embodiment.

DETAILED DESCRIPTION

Figure 1:
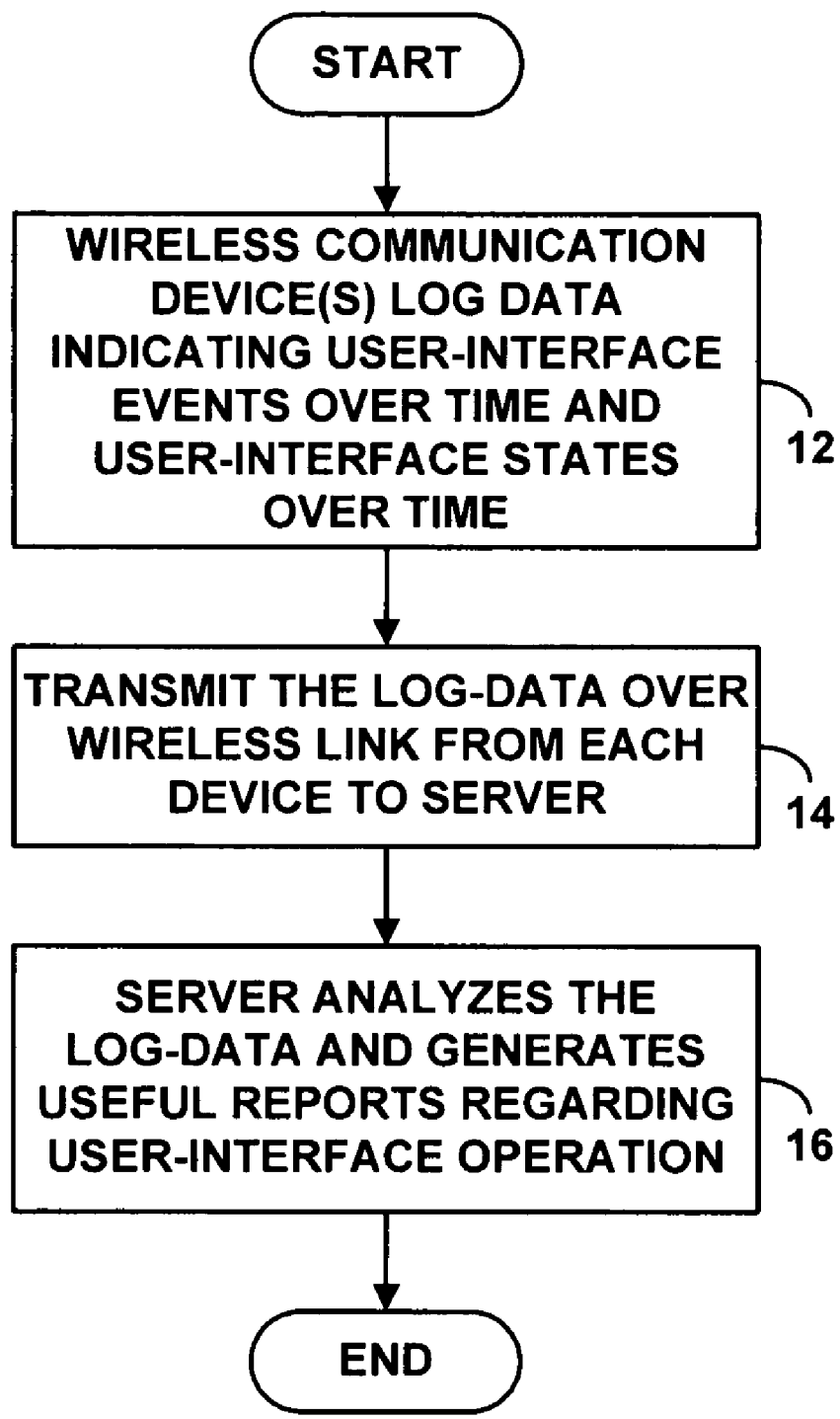
FIG. 1 is a flow chart depicting functions that can be carried out in accordance with an exemplary embodiment of the invention.

Referring to the drawings, FIG. 1 is a flow chart depicting functions that can be carried out in accordance with an exemplary embodiment of the present invention, in order to monitor user-interface operation. As shown in FIG. 1, at step 12, each of one or more wireless communication devices will log data that indicates user-interface events incurred by the device over time and user-interface states of the device over time. At step 14, that logged data will be transmitted from each such device, via a wireless link, to a server (or multiple servers). At step 16, the server will analyze the data and generate one or more output reports or other output data regarding user-interface operation.

Preferably, the logging and transmitting functions will be carried out by multiple wireless communication devices. That way, the server will receive user-interface log-data from multiple devices and can beneficially analyze that data to identify general trends in user-interface operation. (Alternatively, the invention can be applied with respect to the user-interface of a single device, so as to facilitate analysis of user-interface operation on that single device.) The logging and/or transmitting functions of the devices can be initially triggered by an instruction signal (e.g., query signal) transmitted to the devices from a network server. Further, the instructions signal can specify when the devices should start logging, how long the devices log data, and/or when the devices should transmit the data.

Figure 2:
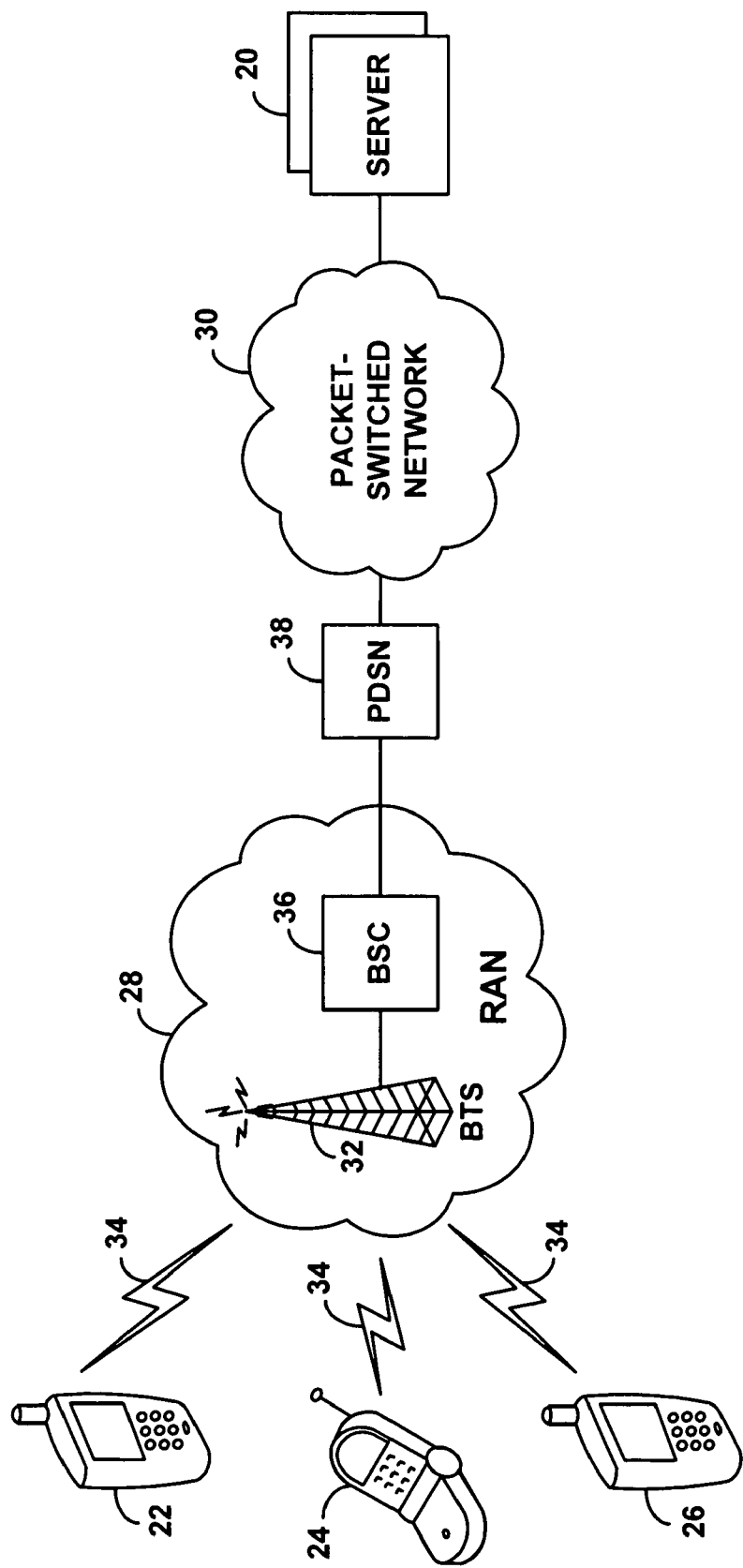
FIG. 2 is a simplified block diagram of a communication system in which the exemplary embodiment can be implemented.

FIG. 2 is a simplified block diagram of a communication system 18 in which multiple wireless communication devices can record their user-interface data and transmit the data to one or more servers 20 in this manner. The example system 18 includes three representative devices 22, 24, 26, all of which are equipped to communicate wirelessly with a radio access network (RAN) 28 and over a packet-switched network 30 with server(s) 20. Example RAN 28 includes a base transceiver station (BTS) 32, which radiates to define an air interface 34 through which the devices 22, 24, 26 can communicate. BTS 32 is then coupled with a base station controller (BSC) 36, which is in turn coupled with a packet data serving node (PDSN) 38 that provides connectivity with packet-switched network 30. And each server 20 sits as a node on network 30.

Communications over the air interface 34 between devices 22, 24, 26 and BTS 32 may comply with any air interface protocol now known or later developed, examples of which include cdma2000®, IS-856 (e.g., EV-DO), TDMA, GSM, and iDen. Using a protocol such as cdma2000®, a wireless communication device can acquire wireless packet data connectivity so as to be able to engage in packet-data communications on network 30. To acquire such connectivity, the device may send an packet-data origination message over the air to the RAN. In response, the BSC 36 may instruct the BTS 32 to assign an air interface traffic channel over which the device can communicate, and the PDSN 38 may establish a data link connection with the device. The PDSN or a mobile-IP home agent (not shown) may then assign an IP address for use by the device to engage in communications on network 30.

Figure 3:
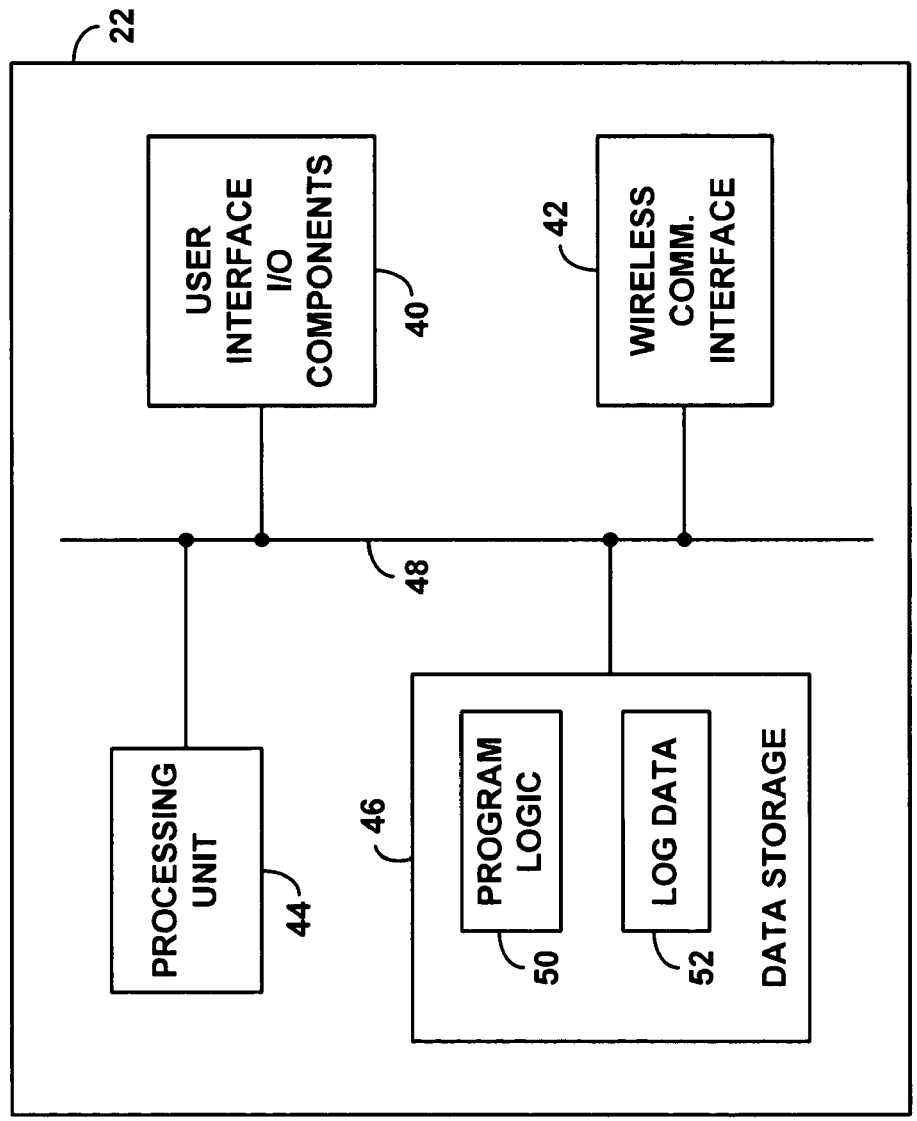
FIG. 3 is a simplified block diagram of a wireless communication device arranged to record user-interface data and transmit the data to a server in accordance with the exemplary embodiment.

FIG. 3 is next a simplified block diagram depicting functional components of an example wireless communication device 22, arranged to carry out the device functions of FIG. 1. The example device 22 could be a cell phone, a personal digital assistant (PDA), a pager, a wirelessly-equipped notebook computer, or any other sort of device. As shown in FIG. 2, the example device 22 includes user-interface I/O components 40, a wireless communication interface 42, a processing unit 44, and data storage 46, all of which may be coupled together by a system bus 48 or other mechanism.

The user-interface I/O components 40 of device 22 are the parts of the device that interface directly with a user, i.e., the components that receive input from a user and/or provide output to a user. By way of example, the user-interface I/O components may include (i) aural components, such as a microphone and a speaker, and associated digital-analog conversion circuitry, through which the device can receive and output audio signals, (ii) visual components, such as a display screen, LEDs, and a camera, through which the device can present and capture visual information, and/or (iii) tactile components, such as a keypad, a touch-sensitive screen, and a vibration mechanism, through which the device can receive tactile user input and provide tactile output. The arrangement and operation of these and other user-interface I/O components are well known in the art and therefore will not be described in detail here.

Wireless communication interface 42 enables communication over air interface 34. As such, wireless communication interface 42 may include a module, such as an MSMT™-series chipset made by Qualcomm Inc. of San Diego, Calif., and an antenna. Wireless communication interface 42 preferably supports wireless packet-data communications according to a well known standard such as cdma2000® but could alternatively or additionally support other air interface protocols.

Processing unit 44 comprises one or more general-purpose processors (e.g., Intel microprocessors) and/or one or more special-purpose processors (e.g., dedicated digital signal processor, application specific integrated circuit, etc.) In turn, the data storage 46 comprises one or more volatile and/or non-volatile storage components, such as magnetic or optical memory or disk storage. Data storage 46 can be integrated in whole or in part with processing unit 44, as cache memory for instance. In the exemplary embodiment, as shown, data storage 46 is configured to hold both program logic 50 and log-data 52.

Program logic 50 preferably comprises machine language instructions that define routines executable by processing unit 44 to carry out various functions described herein. By way of example, the program logic may be executable to control operation of user-interface I/O components 40, such as to cause certain screen images (e.g., menus, informational pages, etc.) to be presented on a display screen in response to certain key-presses or other user input, or to cause certain sounds to be emitted from a speaker in response certain events. As such, the program logic 50 and user-interface I/O components 40 can be considered to cooperatively define the user-interface of the device.

As another example, the program logic 50 is preferably executable to log the occurrence of user-interface events and user-interface states of the device over time. For instance, the program logic 50 may define a logging-routine that gets called each time a user-interface event occurs or the user-interface state changes, and that records in data storage 46 an indication of the user-interface event and/or user-interface state, together with a timestamp indicating when the event occurred or when the state changed. Furthermore the program logic 50 may be executable (i) to analyze the user-interface events over time so as to translate one or more incurred user-interface events into a summary user-interface state, and (ii) to include in the logged data an indication of the expected user-interface state.

In a preferred embodiment, the logging-routine will cause the device to record in real-time the basic user-interface events that the device incurs, and to leave until later the job of analyzing or interpreting those events. By way of example, when a user presses and releases a particular key, the device will preferably record separate "key-down" and "key-up" events, each with a respective timestamp, and the device will leave until later (for the device and/or the server) the act of interpreting that combination of events as being a user actuation of the key. Advantageously, recording user-interface events with such simple granularity preserves valuable information about user-interface operation (such as duration of a key-press, etc.) Further, recording such basic user-interface events without simultaneously interpreting the events can help conserve processing power.

Further, in the preferred embodiment, each user-interface state will be signified by a simple state-ID, such as an integer or string value, encoded in program logic 50 or otherwise specified in data storage 46. When the user-interface state changes, the device will preferably record the new state-ID, together with a timestamp. For example, each user-interface state may be embodied by a particular display screen image (e.g., particular menu, informational page, etc.), and each screen may have a respective screen-name. When the display screen image changes, the device may record the screen-name of the new screen image, together with a timestamp.

FIG. 4 depicts a portion of example log-data 52 that device 22 may record in this manner. As shown, the example data 52 is arranged as a simple table with three columns: (i) screen name, (ii) action, and (iii) time. Device 22 adds a row to the table each time the device incurs a new user-interface event and each time the user-interface state (e.g., screen image) of the device changes. The times shown in this example set of data are exaggerated and rounded for simplicity.

FIG. 4 assumes that, at 1:30:01 p.m. on Jan. 30, 2005, the device enters the "idle" state, in which its default display screen image is presented. In response to that change in state, the device records as the first row of log-data the "Idle" screen name and a corresponding timestamp. After a passage of 1:59:39, at 3:29:40 p.m., a user then presses the MENU key of the device, in response to which the device records in a new row the "MENU press" action with a corresponding timestamp. And one second later, at 3:29:41 p.m., the user then releases the MENU key, so the device records in a new row the "MENU release" action with a corresponding timestamp.

In this example, two seconds after the user releases the MENU key, the device responsively enters a new user-interface state in which it presents its "Menu" screen image. Thus, the device records in a next row the "Menu" screen name and a corresponding timestamp of 3:29:43 p.m.

In turn, seven seconds later, the user begins pressing the DOWN arrow key to move to the fourth menu item. With each press and release of the DOWN arrow key, the device two new rows to the table, with corresponding timestamps (each shown 1 second apart), with a final "DOWN release" timestamp of 3:29:55 p.m. Thereafter, the user waits eight seconds and then presses the SELECT key, so the device records in a new row the "SELECT press" action and a timestamp of 3:30:03 p.m., and three seconds later the user releases the SELECT key, so the device records in another row the "SELECT release" action and a timestamp of 3:30:06 p.m.

As further shown in FIG. 4, the device then enters a "Contacts" screen state and records the screen and a timestamp in the table. And the user then presses and releases a left SOFTKEY, so the device enters two new rows with corresponding timestamps. The device then enters an "Enter Number" screen state and records the screen and a timestamp in the table. And, in turn, the user then presses and releases ten digit keys to enter a phone number "9138901234," so the device enters new rows into the table accordingly. (In an alternative embodiment, the log data can hide the phone number the user dialed, by not specifying the particular digits dialed.) Finally, the user presses and releases the left SOFTKEY again, in response to which the device enters two new rows into the table.

Returning now to FIG. 3, program logic 50 is further executable in accordance with the exemplary embodiment to transmit some or all of its logged data to one or more servers. The program logic can cause the device 22 to carry out this function periodically or in response to one or more other triggering events (e.g., in response to a determination that the device is currently in an idle state). Preferably, the device will transmit its log-data in the form of incremental updates, sending to the server(s) the log-data that the device recorded since the its last log-data transmission. Further, as noted above, the device will preferably transmit its log-data over a wireless packet data connection, using a packet-data transmission protocol such as FTP or HTTP for instance.

The device can maintain its log-data on a first-in first-out basis, by deleting log-data that is older than a certain designated period of time so as to conserve storage space, or by deleting the oldest data once a designated storage space becomes full. Consequently, in some instances, older logged data may deleted without first being reported to the server(s).

The device may transmit all of its log-data to a single server, by sending the log-data in a data file to an IP address, URL, or other network address that has been encoded in program logic or that is otherwise known to device 22. Alternatively, recognizing that some of the log-data might be relevant to some people (e.g., a certain division of a wireless carrier) and other log-data might be relevant to other people (e.g., some other division of the wireless carrier), the device may instead be arranged to transmit portions of its log-data separately to two or more servers. For instance, the device may transmit its main-menu related log-data to one server (to facilitate analysis of the menu user-interface functions), and the device may transmit its contacts related log-data to another server (to facilitate separate analysis of the contacts user-interface functions).

To facilitate transmission of some log-data to one server and other log-data to another server, program logic 50 may include or have access to data that correlates certain events and states with certain destination-indicators, such as IP addresses or URLs. The program logic 50 may then cause device 22 to record, together with each user-interface event and/or each user-interface state, a corresponding destination-indicator, and the device may thereafter transmit each respective portion of log-data to the indicated network address. (For this purpose, the example table of FIG. 4 could be expanded to include a fourth column for destination-indicators.) Alternatively, the device may send portions to respective network addresses without recording destination indicators in the log-data.

In order to facilitate analysis of log-data that is specific to a particular device-type (e.g., make and model), the device may further send together with its log data a device-identifier or device-type identifier. Alternatively, if the analysis will be directed to just a specific device type, the device may omit a device-type identifier.

Figure 5:
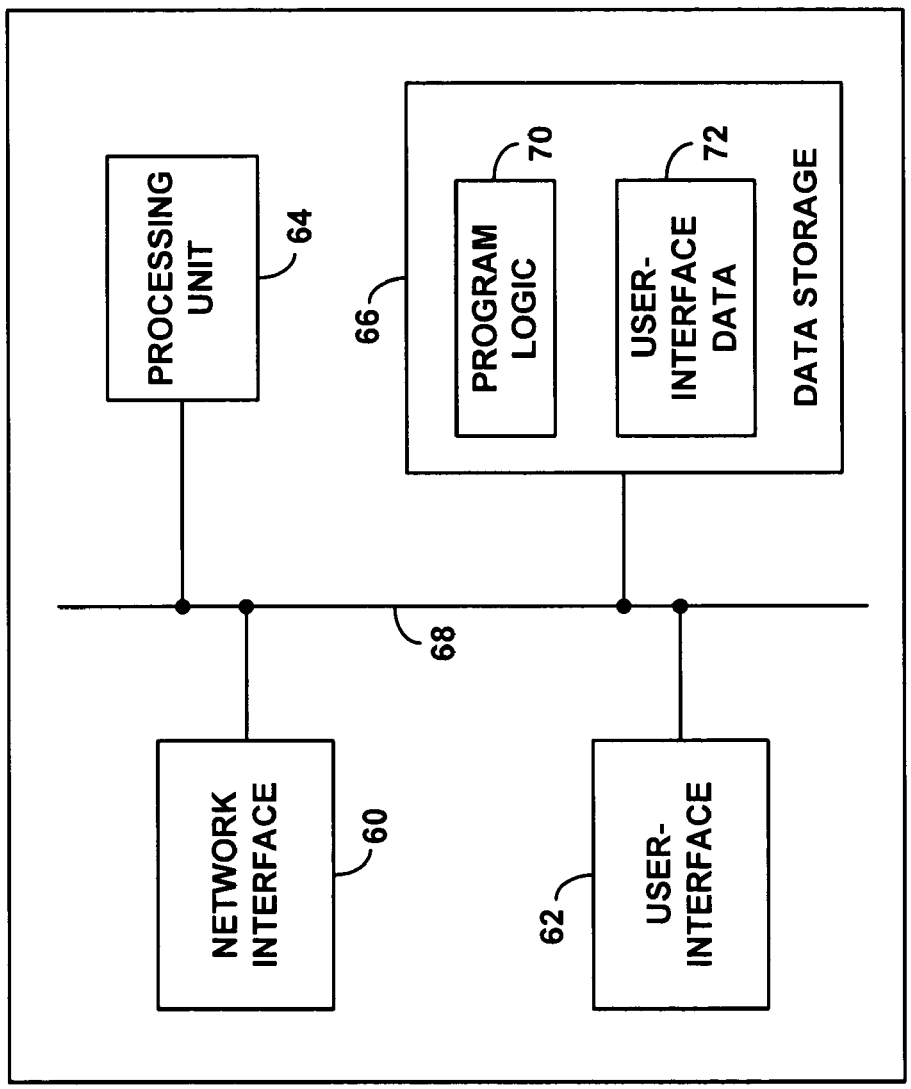
FIG. 5 is a simplified block diagram of a server arranged to receive and analyze user-interface log-data and to produce output data in accordance with the exemplary embodiment.

In accordance with the exemplary embodiment, each server 20 will be arranged to receive user-interface log-data transmitted from one or more wireless communication devices, and to produce one or more useful output reports or other output data based on the log-data. FIG. 5 is a simplified block diagram depicting functional components of an example server 20 arranged to carry out these functions. As shown in FIG. 5, example server 20 includes a network interface 60, a user-interface 62, a processing unit 64, and data storage 66, all of which may be coupled together by a system bus 68 or other mechanism.

Network interface 60 enables communication on packet-switched network. As such, network interface 60 may take the form of an Ethernet network interface card that can be coupled with a router of network 30. Alternatively, network interface 60 may take other forms, providing for wired and/or wireless communication on network 30.

User-interface 62 of server 20 preferably includes components to receive user queries for data and to responsively present output data. By way of example, the user-interface 62 may include a keyboard and mouse through which a user can enter queries, and a display screen for presenting text and graphic reports. Alternatively, one or more other computer terminals can be connected with server 20, e.g., through network 30, in order to access the collected (and analyzed)

log-data from server 20, and those one or more other terminals might themselves possess user-interface 62.

Processing unit 64 comprises one or more general purpose processors and/or one or more special purpose processors. And data storage 66 comprises one or more volatile and/or non-volatile storage components, which can be integrated in whole or in part with processing unit 64. As further shown, data storage 66 is equipped to hold program logic 70 and user-interface data 72.

Program logic 70 of server 20 preferably comprises machine language instructions that are executable by processing unit 64 to carry out various functions described herein. By way of example, the program logic 70 may be executable by processing unit 64 to receive user-interface log-data transmitted from one or more wireless communication devices, such as devices 22, 24, 26, and to store the log-data in data storage 66. Further, the program logic 70 is preferably executable by processing unit 64 to analyze and manipulate the received data, so as to produce one or more useful output reports or other data, in response to a user query for instance.

In accordance with the exemplary embodiment, the server will preferably translate the raw log-data that it receives from the device(s) into a form that is more readily understandable and useful to an observer. By way of example, provided with granular log-data such as that shown in FIG. 4, the server can roll up the data to indicate just the relevant bottom-line information, such as the fact that it took a user a certain amount of time to press a given key since the last key-press, or that the user pressed a certain number of character keys to enter a number or other string.

Further, the server could translate device-specific (e.g., device-type specific) user-interface events and states into generalized (device-independent) user-interface events and states, so as to facilitate generalized analysis of user-interface operation across multiple device types. For instance, if one device type has a "PHONE BOOK" function and another device type has an equivalent "CONTACTS" function, the server could record actuation of either function as actuation of a "CONTACTS" function, to facilitate analysis of how often users actuate that function, regardless of device type.

FIG. 6 depicts an example set of user-interface data 72 that could result from server 20 translating the raw data of FIG. 4 (as well as other raw data not shown in FIG. 4). The example user-interface data 72 is arranged as a table with five columns: (i) screen-name, (ii) action, (iii) time, (iv) op-time, and (v) screen time. Each value in the screen-name column indicates screen-name (as in the sample log-data 52 of FIG. 4), each value in the action column indicates a user-interface action, each value in the time column indicates the time when the user-interface action was completed, each value in the op-time column indicates the duration since the last action timestamp, and each value in the screen time indicates the total duration that a respective screen was displayed (i.e., the duration of the user-interface state).

As shown in FIG. 6, the log-data provided by device 22 has been simplified to remove extraneous information (while preferably retaining that information for reference and to use as the basis for more specific reporting if desired). The first row of the resulting user-interface data 72 shows the "Idle" screen state and indicates that the device was in the idle state for a duration of 2:01:40, i.e., until the device entered the "Menu" state. The second row shows that the user engaged the MENU button at 3:29:41, which is 1:59:40 after the idle state began. And the next row shows that the device then entered the "menu" state at 3:29:43 and that the device was in the menu state for a duration of 0:00:25.

The next row shows in summary that the user then engaged the DOWN arrow key three times, finishing at 3:29:55, and then engaged the SELECT key after waiting a duration of 0:00:06. The "3 DOWN" entry represents a rolled up version of the six DOWN key entries in the raw data, thus presenting a more concise picture.

As an alternative, however, rather than listing the summary DOWN arrow entry and SELECT entry, server 20 could translate the data even further, by reference to a known structure/design of the user-interface. In particular, given that the CONTACTS menu item is the fourth item listed on the Menu screen, and given that the user engaged the DOWN arrow three times starting at the first menu item and then engaged the SELECT key, the server could logically conclude that the user had thereby selected the CONTACTS menu item. Thus, instead of the "3 DOWN" and "SELECT" entries in the user-interface data, the server could simply list a CONTACTS action.

The next row of the user-interface data shows that the device then entered the "Contacts" state at 3:30:10 and remained in that state for a duration of 0:00:04. In turn, the next row shows that the user engaged the ADD softkey at 3:30:21. In this regard, note that the raw data of FIG. 4 showed that the user pressed and released the LEFT SOFTKEY at this point. By reference to the know structure/design of the user-interface, the server can conclude that engaging the LEFT SOFTKEY when in the "Contacts" state constituted softkey selection of the ADD item, as shown in FIG. 6.

In turn, the next row shows that the device entered the "Enter Number" state at 3:30:22 and remained in that state for a duration of 0:00:39. The next rows show in summary that, while the device was in the Enter Number state, the user entered 10 characters and, after waiting a duration of 0:00:19, the user pressed the NEXT softkey.

The data within the table of FIG. 6 represents user-interface operation on a single device, device 22. In accordance with the exemplary embodiment, as described above, multiple devices will send such information to the server. The server may then store all such data within a relational database, so as to facilitate analysis of and reporting on general trends regarding user interface operation. Provided with such data, for instance, the server can respond to database queries by providing useful tables, charts, and other reports indicating information such as (i) how long on average it takes users to enter telephone numbers in new contact entries, (ii) how long on average it takes devices to transition to new screens after user selections, (iii) how long on average it takes devices to transition from a given screen state to another screen state, (iv) what time of day users tend to use their devices, (v) how many users tend to use a designated series of keystrokes to accomplish a particular task that can be accomplished more simply through fewer keystrokes, and so forth.

In an alternative embodiment, note that part or all of the data translation could be carried out by the devices themselves. For example, after device 22 collects the log-data of FIG. 4, the device could programmatically translate the data into a form similar to that shown in FIG. 6. The device could then send the translated data and/or the raw data to server 20 for analysis.

An exemplary embodiment of the present invention has been described above. Those skilled in the art will understand, however, that changes and modifications may be made to this embodiment without departing from the true scope and spirit of the present invention, which is defined by the claims.

We claim:

1. A method of monitoring user-interface operation comprising:

in each of one or more wireless communication devices, logging data that includes (i) recorded indications of one or more user-interface events incurred by the respective device together with respective time stamps of the incurred user-interface events, and (ii) recorded indications of one or more user-interface states incurred on the respective device together with respective time stamps of the incurred user-interface states; and transmitting the logged data from each of the one or more wireless communication devices, via a wireless link, to a first server and a second server, to facilitate programmatic analysis of the logged data to determine an amount of time taken to transition the user-interface from a designated first user-interface state to a designated second user-interface state, and to facilitate generation of one or more reports regarding operation of the user-interface, wherein at least one of the one or more reports indicate the amount of time, and wherein, based on correlation data that correlates the logged user-interface events and the logged user-interface states with addresses of the first server and the second server, at least a given one of the one or more wireless communication devices transmits a first portion of the data logged by the given device to the first server and transmits a second portion of the data logged by the given device to the second server.

2. The method of claim 1, wherein logging the data in the given device of the one or more wireless communication devices comprises:

each time the given device incurs a user-interface event, recording in data storage of the given device an indication of the incurred user-interface event together with a respective timestamp; and each time the given device transitions to a user-interface state, recording in the data storage of the given device an indication of the user-interface state together with a respective timestamp.

3. The method of claim 1, further comprising:

receiving the logged data on at least one of the first server and the second server;

programmatically analyzing the logged data to determine the amount of time that it takes to transition the user-interface from the designated first state to the designated second state; and generating the at least one report.

4. The method of claim 3, wherein receiving the logged data comprises receiving the logged data from multiple wireless communication devices;

and wherein the amount of time is an average for the multiple devices.

5. The method of claim 1, further comprising:

receiving the logged data on at least one of the first server and the second server; and programmatically analyzing the logged data to translate one or more user-interface events into a summary user-interface event.

6. The method of claim 1, wherein each address of the first server and the second server comprises a network address selected from the group consisting of an Internet Protocol (IP) address and a Uniform Resource Locator (URL).

7. The method of claim 1, wherein the logged data includes addresses of the first server and the second server to which the logged data should be transmitted.

8. The method of claim 1, wherein each of the one or more wireless communication devices communicates over the wireless link with a radio access network and in turn via a packet-switched network with at least one of the first server and the second server.

9. The method of claim 1, further comprising:

receiving the logged data from a plurality of wireless communication devices on at least one of the first server and the second server; and analyzing the received logged data at the at least one of the first server and the second server, and producing an output report regarding user-interface operation.

10. A system for monitoring user-interface operation comprising:

a network interface;
a processing unit;
data storage; and
program logic stored in the data storage and executable by the processing unit (i) to receive log-data via the network interface from one or more wireless communication devices, wherein the log-data includes (a) recorded indications of one or more user-interface events incurred by the respective device together with respective time stamps of the incurred user-interface events, and (b) recorded indications of one or more user-interface states incurred on the respective device together with respective time stamps of the incurred user-interface states, (ii) to analyze the log-data to determine an amount of time taken to transition the user-interface from a designated first user-interface state to a designated second user-interface state, and (iii) to facilitate generation of one or more reports regarding operation of the user-interface, wherein at least one of the one or more reports indicate the amount of time, wherein the program logic is further executable to perform at least one function selected from the group consisting of (i) translating one or more user-interface events in the log-data into a summary user-interface event and (ii) translating device-specific user-interface data into device-independent user-interface data, and wherein the one or more user-interface events comprises a sequence of key-presses by a user of a given wireless communication device as the user navigates a menu structure of the user-interface, and the summary user-interface event comprises a summary representation of the sequence of key-presses including a specification of a duration of time it took for the user to navigate through the menu structure.

11. The system of claim 10, further comprising:

the one or more wireless communication devices, wherein the one or more wireless communication devices are programmed to record and transmit the log-data.

12. The system of claim 10, wherein the program logic is executable to analyze the log-data so as to determine what time of day users tend to use their devices.

13. A method of monitoring user-interface operation in a wireless communication device (WCD), wherein the WCD stores a first destination-indicator and a second destination-indicator, the method comprising:

the WCD logging a first plurality of data that (i) specifies a first set of user-interface events incurred by the WCD over time together with respective time stamps of the first set of incurred user-interface events, and (ii) indicates a first set of user-interface states incurred on the WCD over time together with respective time stamps of the first set of incurred user-interface states;

the WCD logging a second plurality of data that (i) specifies a second set of user-interface events incurred by the WCD over time together with respective time stamps of the second set of incurred user-interface events, and (ii) indicates a second set of user-interface states incurred on the WCD over time together with respective time stamps of the second set of incurred user-interface states;

based on correlation data that correlates the first destination-indicator with the first set of user-interface events and the first set of user-interface states represented in the first plurality of data, the WCD determining the first destination-indicator;

the WCD transmitting the first plurality of data, via a wireless link, to a first server, wherein the first server is associated with the first destination-indicator, thereby facilitating analysis of the first plurality of data by the first server;

based on correlation data that correlates the second destination-indicator with the second set of user-interface events and the second set of user-interface states represented in the second plurality of data, the WCD determining the second destination-indicator; and the WCD transmitting the second plurality of data, via the wireless link, to a second server, wherein the second server is associated with the second destination-indicator, thereby facilitating programmatic analysis of the logged data to determine an amount of time taken to transition the user-interface from a designated first user-interface state to a designated second user-interface state, and to facilitate generation of one or more reports regarding operation of the user-interface, wherein at least one of the one or more reports indicate the amount of time.

* * * * *